(12) United States Patent
Hall-Snyder et al.

(10) Patent No.: US 12,196,330 B2
(45) Date of Patent: Jan. 14, 2025

(54) AUTOMATIC RESET FLOOD VALVE

(71) Applicant: Tesla, Inc., Palo Alto, CA (US)

(72) Inventors: Nathaniel Hall-Snyder, Redwood City, CA (US); Ian Casimir Dimen, San Francisco, CA (US); Richard Wurden, Mountain View, CA (US)

(73) Assignee: Tesla, Inc., Austin, TX (US)

( * ) Notice: Subject to any disclaimer, the term of this patent is extended or adjusted under 35 U.S.C. 154(b) by 0 days.

(21) Appl. No.: 17/306,264

(22) Filed: May 3, 2021

(65) Prior Publication Data

US 2021/0254732 A1    Aug. 19, 2021

Related U.S. Application Data

(63) Continuation of application No. 16/246,807, filed on Jan. 14, 2019, now Pat. No. 10,995,867.

(60) Provisional application No. 62/617,918, filed on Jan. 16, 2018.

(51) Int. Cl.
| | |
|---|---|
| *H01M 50/24* | (2021.01) |
| *F16K 15/14* | (2006.01) |
| *F16K 17/02* | (2006.01) |
| *F16K 31/00* | (2006.01) |
| *H01M 50/204* | (2021.01) |
| *H01M 50/308* | (2021.01) |
| *H01M 50/325* | (2021.01) |

(52) U.S. Cl.
CPC ............ *F16K 15/148* (2013.01); *F16K 17/02* (2013.01); *F16K 31/001* (2013.01); *H01M 50/204* (2021.01); *H01M 50/24* (2021.01); *H01M 50/308* (2021.01); *H01M 50/325* (2021.01); *Y02E 60/10* (2013.01)

(58) Field of Classification Search
CPC .... H01M 50/24; H01M 50/308; H01M 50/20; H01M 50/325
See application file for complete search history.

(56) References Cited

U.S. PATENT DOCUMENTS

| | | | |
|---|---|---|---|
| 8,919,273 B1 * | 12/2014 | Hoffman | B63B 13/00 114/312 |
| 10,995,867 B2 * | 5/2021 | Hall-Snyder | F16K 15/148 |
| 2012/0237803 A1 | 9/2012 | Mardall et al. | |
| 2014/0213934 A1 * | 7/2014 | Ellis | A61B 10/0096 600/573 |
| 2018/0216749 A1 * | 8/2018 | Pedersen | F16K 31/404 |

* cited by examiner

*Primary Examiner* — Olatunji A Godo
(74) *Attorney, Agent, or Firm* — Knobbe, Martens, Olson & Bear, LLP (57) ABSTRACT

A valve includes a holder having an expandable material. The valve includes a retainer coupled to the holder. The valve further includes an umbrella member with a stem coupled to the holder. The expandable material is adapted to expand in size when absorbing a fluid and translate the umbrella member along an axis of the stem.

15 Claims, 13 Drawing Sheets

AUTOMATIC RESET FLOOD VALVE

CROSS REFERENCE TO RELATED PATENTS

This application is a continuation of U.S. patent application Ser. No. 16/246,807, entitled "AUTOMATIC RESET FLOOD VALVE," filed Jan. 14, 2019, which claims priority to U.S. Provisional Patent Application No. 62/617,918, entitled "AUTOMATIC RESET FLOOD VALVE", filed Jan. 16, 2018, each of which is hereby incorporated herein by reference in its entirety and made part of this application for all purposes.

TECHNICAL FIELD

The present disclosure relates to mechanical aspects of an umbrella valve device, which may be used as a release mechanism for a battery enclosure or other enclosure to release any accumulated fluid or pressurized gas from inside the module.

BACKGROUND

Battery enclosures typically include a housing with multiple cells housed inside. During operation, cells may rupture expelling gas and liquid. Further, undesired fluid or pressurized gas may also fill the module through failures, such improper sealing when exposed to an external water source. Conversely, the battery enclosure may be exposed to water (or other liquid) external to it. In such a circumstance, it is vital to make sure that no external fluids enter the inside of the battery enclosure as this could cause shorting of the battery cells or wiring, creating an unsafe situation. Thus, there should be an opening or a channel through which this undesired fluid or vapor can be drained. Conventional drains have a valve for selectively releasing fluid from inside of a housing, like a battery enclosure. However, such valves need to be manually operated, and periodic external interventions are necessary for operation of such valves. Therefore, an improved design of valve for such an application is required.

SUMMARY

The present disclosure provides a valve to selectively seal an opening. a valve includes a holder having an expandable material. The valve includes a retainer coupled to the holder. The valve further includes an umbrella member with a stem coupled to the holder. The expandable material is adapted to expand in size when absorbing a fluid and translate the umbrella member along an axis of the stem. The expandable material may be made of cellulose, silica gel, sodium polyacrylate, other hygroscopic polymers, or another expanding material. The expandable material can expand in size on when in contact with a fluid and can return to original shape when not in contact with fluid. When fluid is collected inside housing and expandable material absorbs the fluid, the expandable material swells, and pushes the retainer to apply force on a circumferential boundary portion of the membrane. Application of force on the circumferential boundary portion of the membrane tilts a second umbrella member portion and allows drainage of fluid from inside housing. The valve is self-actuatable, and drains fluid from inside the housing after force is applied on the circumferential boundary portion of the membrane exceeds a certain threshold. Once fluid is drained from module, the absorbed liquid evaporates or is otherwise removed from the expandable member and returns to its original size thereby closing the valve. Preferentially, there is no need for external intervention for functioning of valve for the removal of the absorbed liquid.

In embodiments, a battery enclosure is disclosed. The battery enclosure includes an enclosure. The battery enclosure includes a plurality of cells housed inside the enclosure. The battery enclosure includes an umbrella member with a stem coupled to a housing. The battery enclosure includes a retainer coupled to the enclosure, a holder and the umbrella member. An expandable material is disposed within the holder. The expandable material is adapted to expand in size when absorbing a fluid and translate the umbrella member along an axis of the stem.

In embodiments, a method to assemble a valve into a battery system is described. The method includes assembling a valve within a battery enclosure, the valve having an umbrella member with a stem. The method further includes providing an enclosure of the battery system, providing an opening defined by a surface of the enclosure of the battery system, positioning a retainer within the enclosure, coupling a holder to the retainer, positioning expandable material within holder, inserting the stem of the umbrella member into the holder, and positioning the umbrella member such that the umbrella member provides a liquid tight seal for the opening. The method may further include steps to disengage valve from enclosure by twisting the valve to disengage a valve from the enclosure and pulling valve out of opening. Easy assembly and disassembly steps make valve easily replaceable and convenient to use. In embodiments, the steps of coupling a holder to the retainer and positioning expandable material within holder occur prior to positioning a retainer within the enclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting it.

DETAILED DESCRIPTION

Figure 1:
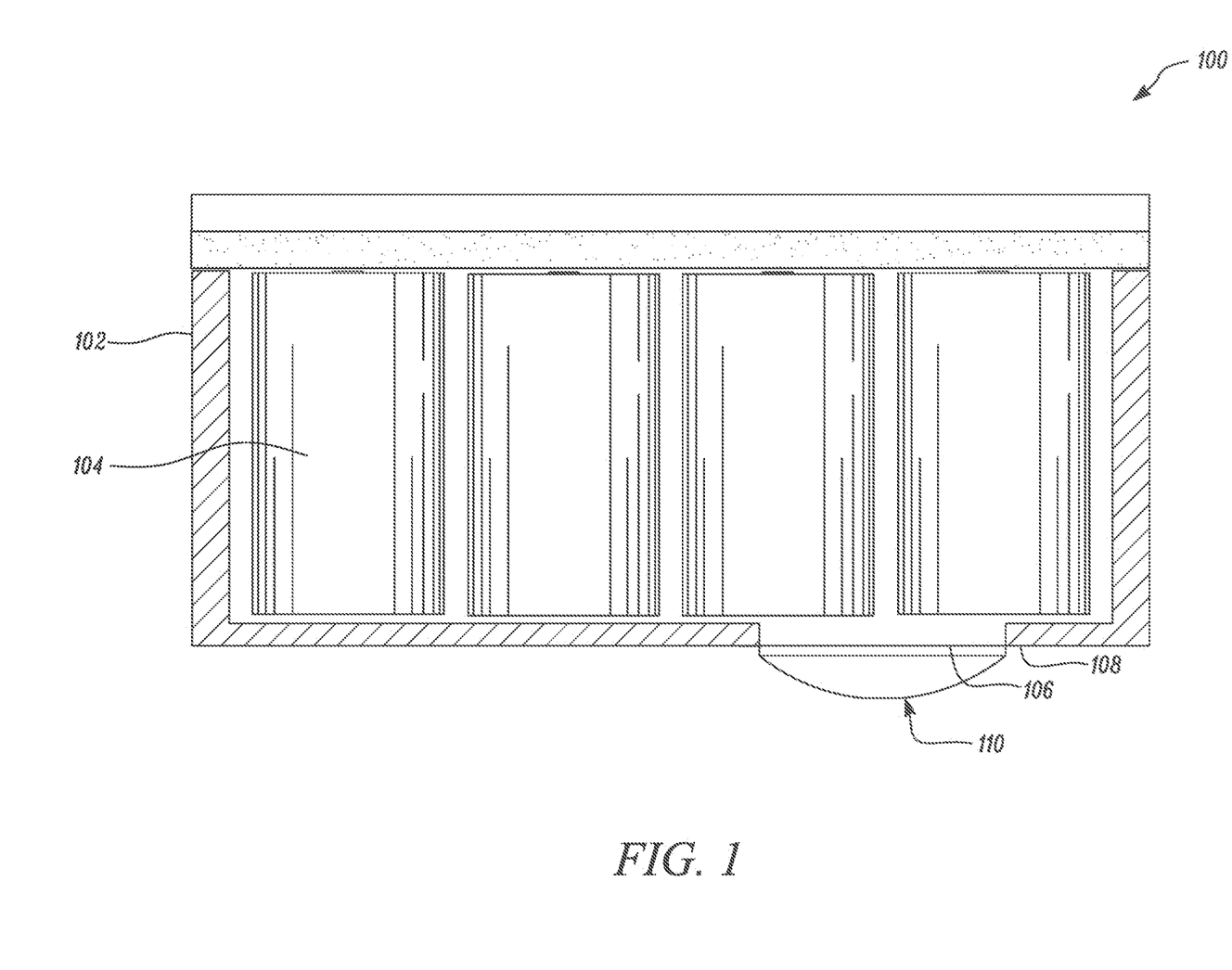
FIG. 1 illustrates a battery enclosure, according to certain embodiments of the disclosure.

FIG. 1 illustrates a battery system 100. Battery system 100 includes enclosure 102. Multiple cells 104 are housed inside enclosure 102 such that cells 104 may provide power as per application requirements. An opening 106 is defined by a surface 108 of enclosure 102. Opening 106 helps in draining any fluid from enclosure 102. Valve 110 is coupled to opening 106 such that valve 110 selectively allows drainage of fluid from enclosure 102. Valve 110 is designed such that valve 110 gets self-actuated under load of fluid accumulated inside enclosure 102, and allows passage of fluid afterwards. Once fluid is removed from enclosure 102, valve 110 gets closed again on its own without any external intervention. Appropriate passage may be provided for fluid passing out of enclosure 102, to prevent any spillage of fluid near battery system 100.

Figure 2:
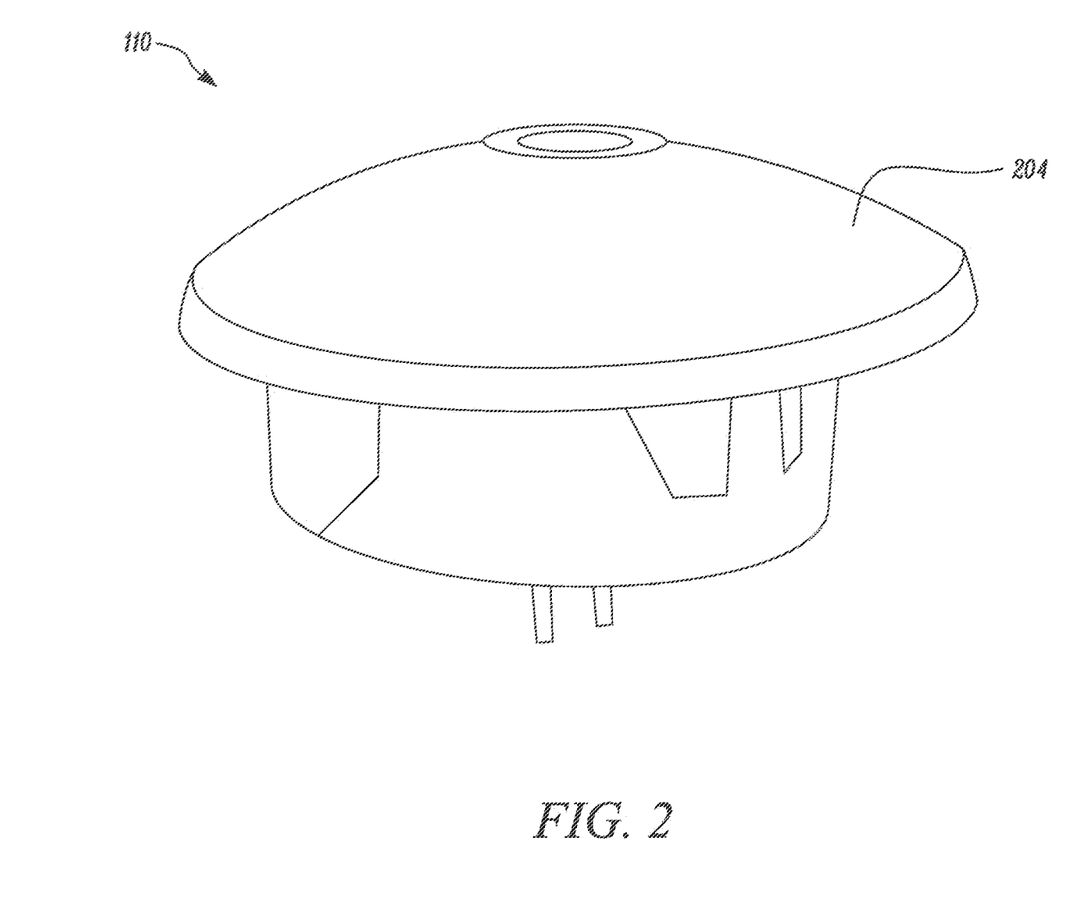
FIG. 2 illustrates a valve for use with housing of battery enclosure, according to certain embodiments of the disclosure.
Figure 3A:
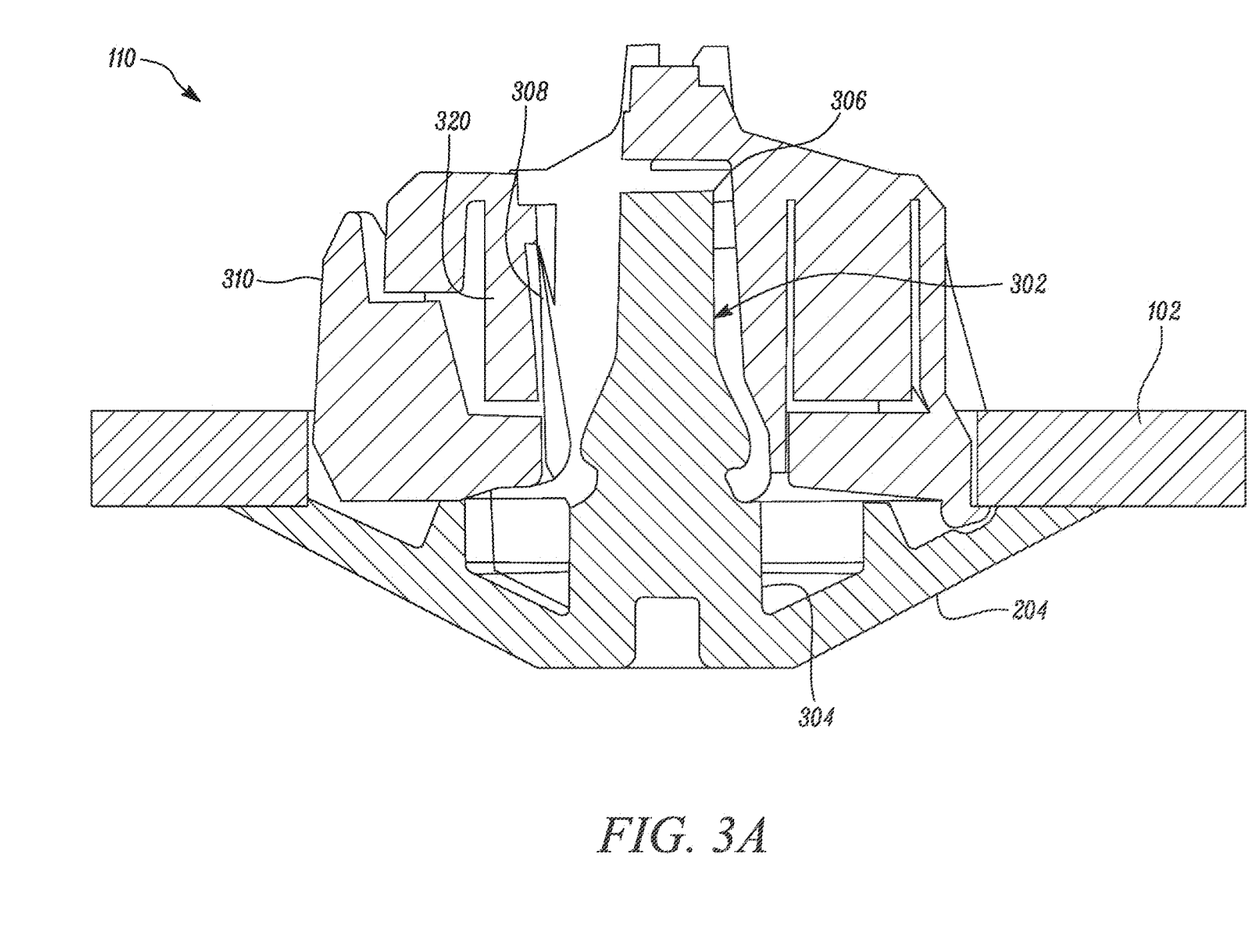
FIG. 3A illustrates a cross-sectional view of the valve being used with housing of battery enclosure, according to certain embodiments of the disclosure.

FIG. 2 illustrates a perspective view of valve 110. Valve 110 includes an umbrella member 204 that has a stem with a curved top that resembles an umbrella. Valve 110 is coupled to enclosure 102 when valve 110 is operational. FIG. 3A shows a cross-sectional view of valve 110 coupled to enclosure 102. Umbrella member 204 includes a stem 302. Stem 302 has a first end 304 and a second end 306. Umbrella member 204 is placed within a retainer 310 and holder 320, which also holds with expandable material 312 (not shown in FIG. 3). In embodiments, retainer 310 contains a tab that helps retainer 310 couple to holder 320. Valve 110 is inserted inside opening 106 of enclosure 102. In embodiments, stem 302 further includes a conical washer. The conical washer may be a flexible component that extends away from stem 302. In embodiments, the conical washer constrains the expanding material. The conical washer may be made of the same material as the stem 302 and/or umbrella member 204. In other embodiments, the conical washer is made of a different material than 302 and/or umbrella 204.

Valve 110 includes retainer 310. Retainer 310 couples to holder 320, which holds expandable material 312. Retainer 310 may also couple to enclosure 102. In embodiments, retainer 310 has expandable tabs to apply pressure when retainer is coupled to enclosure 102, thereby locking valve 110 into enclosure 102. In embodiments, opening 106 in enclosure 102 is circular with small expanded areas. In such an embodiment, the valve 110 may be removed by rotating the valve 110 such that the force on the expandable tabs is reduced when the rotation causes the expandable tabs to reach expanded areas of opening 106.

Figure 3B:
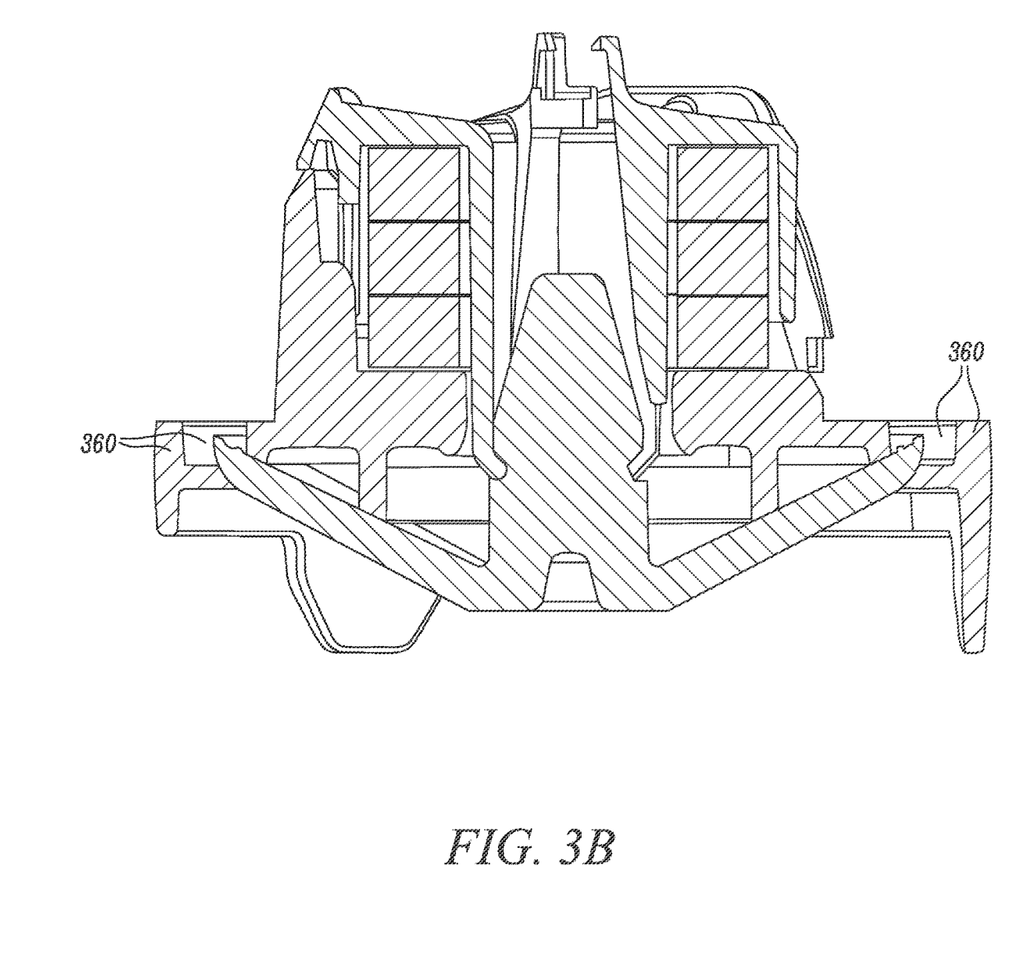
FIG. 3B illustrates a cross-sectional view of the valve according to certain embodiments of the disclosure.

The expandable material 312 held by holder 320 may be made up of cellulose-based material, silica gel, sodium polyacrylate, other hydroscopic polymers, or another expanding material. When in contact with fluid, the expandable material 312 absorbs fluid and expands in size. Further, when the expandable material 312 is not in contact with fluid, the expandable material 312 loses absorbed fluid and contracts in size. In embodiments, the expandable material 312 is donut shaped, that is circular with a center hole. In certain embodiments, the retainer 310 has a portion that extends wider circumferentially than the membrane and contains a spray shield 360 (spray shield shown in FIG. 3B). The spray shield 360 is a member that extends around the circumference of the membrane and prevents fluid ingress from spray of any liquid from unintendedly entering the battery enclosure (or other enclosure), for example, when a user power washes the battery enclosure.

Figure 4:
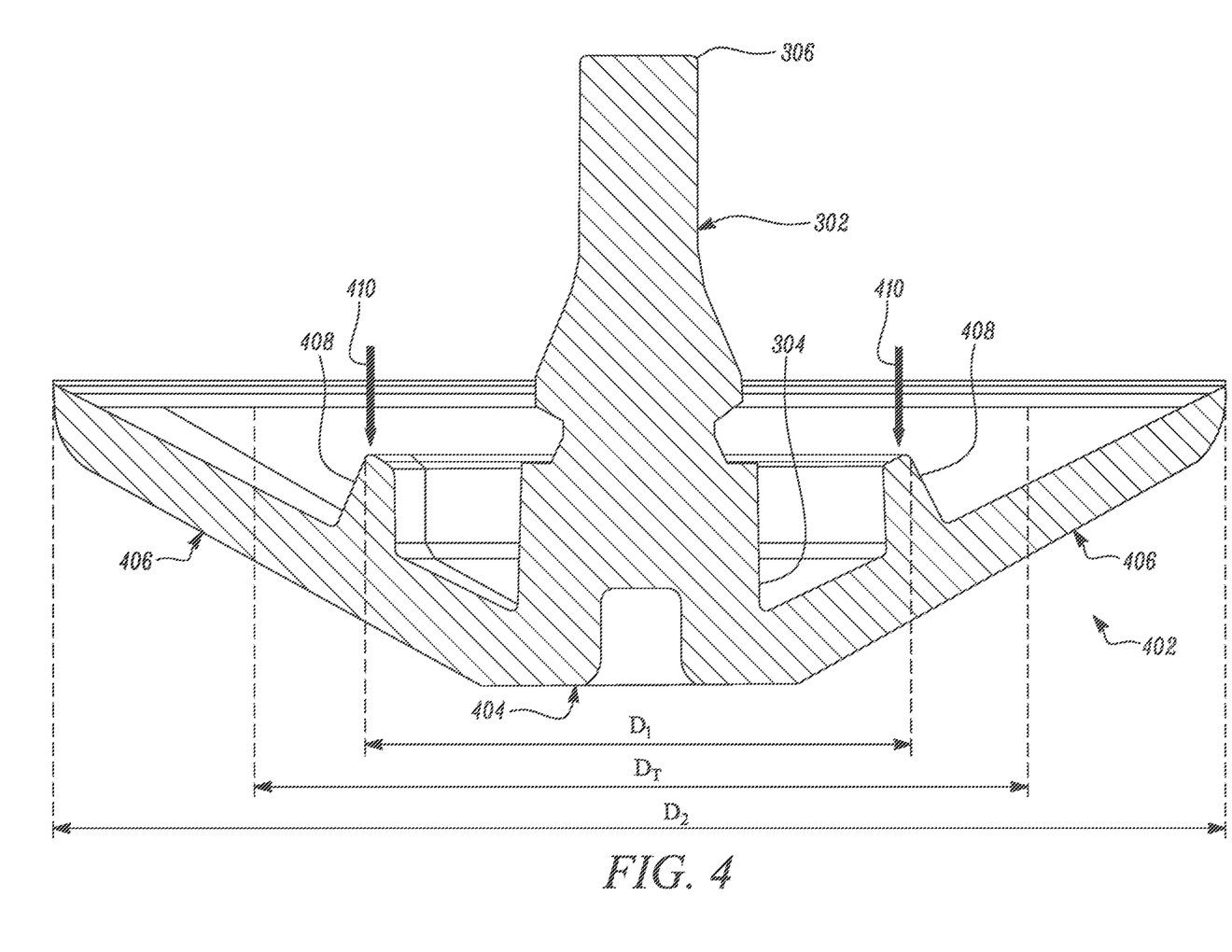
FIG. 4 shows a cross-sectional view of a valve element of valve, according to certain embodiments of the disclosure.

FIG. 4 illustrates further structural details of umbrella member 402. Umbrella member 402 has a stem 302 with second end 306 that resembles an umbrella. Second end 306 is coupled to first end 304 of stem 302, and extends substantially radially away from first end 304 of stem 302. Umbrella member 402 includes a first umbrella member portion 404 and a second umbrella member portion 406, which together form a substantially conical shape of the umbrella member 402. First umbrella member portion 404 extends radially away from first end 304 of stem 302. First umbrella member portion 404 defines a circumferential boundary portion 408, which has a first diameter $D_1$.

Umbrella member 402 further includes second umbrella member portion 406. Second umbrella member portion 406 extends radially away from circumferential boundary portion 408 and has a second diameter $D_2$. When operational, second umbrella member portion 406 extends from circumferential boundary portion 408 to enclosure 102, and seals enclosure 102 to prevent passage of any fluid from inside of enclosure 102 to outside of enclosure 102, as well as passage of any fluid from outside of enclosure 102 to inside of enclosure 102. Second umbrella member portion 406 is adapted to be tilted on application of a force on circumferential boundary portion 408 in a direction away from enclosure 102. Direction of application of force is depicted by arrows 410.

For second umbrella member portion 406 to tilt relative to first umbrella member portion 404 on application of force on circumferential boundary portion 408, second diameter $D_2$ should be greater than or equal to a threshold tilting diameter $D_T$. In other words, threshold tilting diameter $D_T$ is defined as minimum value of second diameter $D_2$ for second umbrella member portion 406 to tilt relative to first umbrella member portion 404 on application of force on circumferential boundary portion 408. For example, a ratio of threshold tilting diameter $D_T$ and first diameter $D_1$ may be between 1.4-3.0. In certain embodiments, the ratio may be greater than 3.0.

During operation, when the membrane pivots, the umbrella member may be translated along the axis of the stem. In embodiments, a conical washer portion is located around the stem, which constrains the expanding material. This constrains the valve in a closed manner until the expanding material absorbs sufficient liquid to overcome the constraint and translate the valve along the axis from the pivoting of the membrane (and release fluid).

Figure 5:
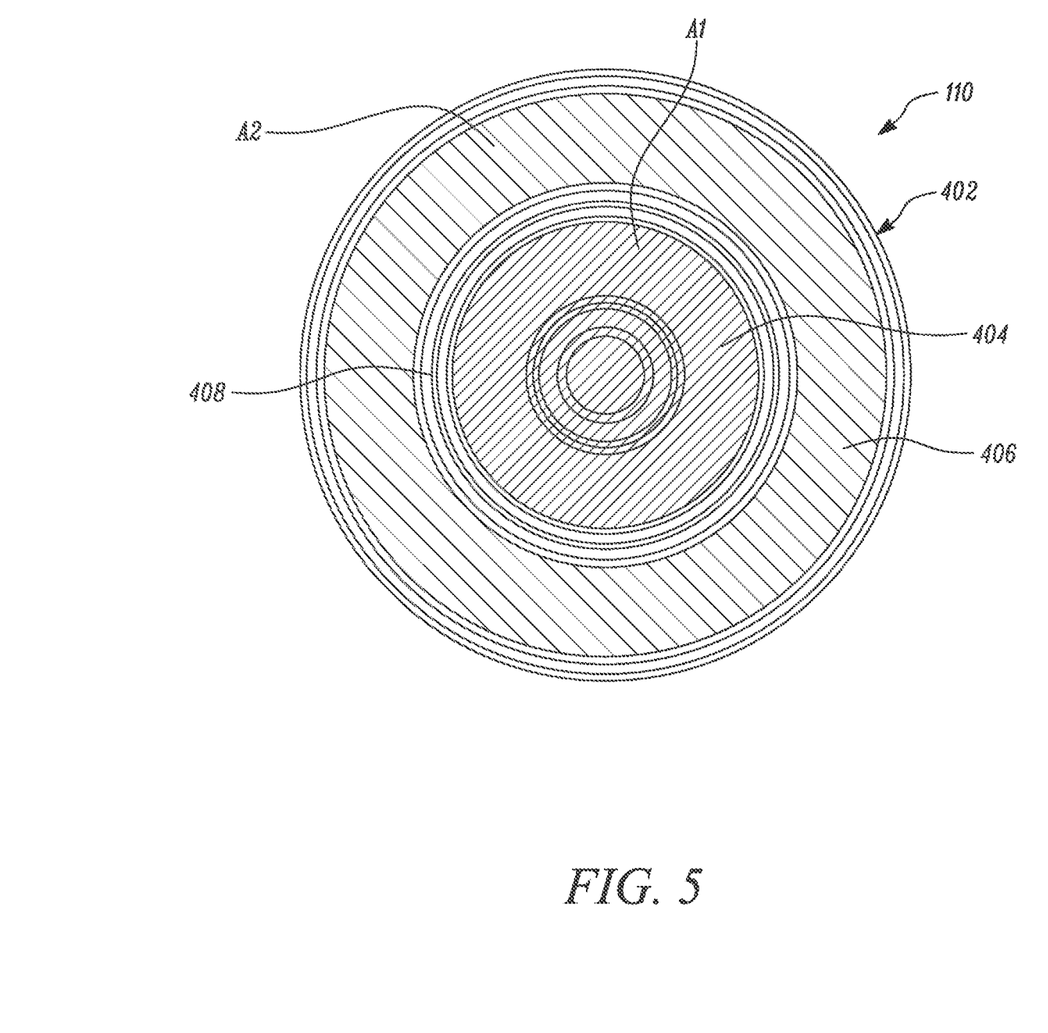
FIG. 5 shows a bottom view of valve element, according to certain embodiments of the disclosure.
Figure 6:
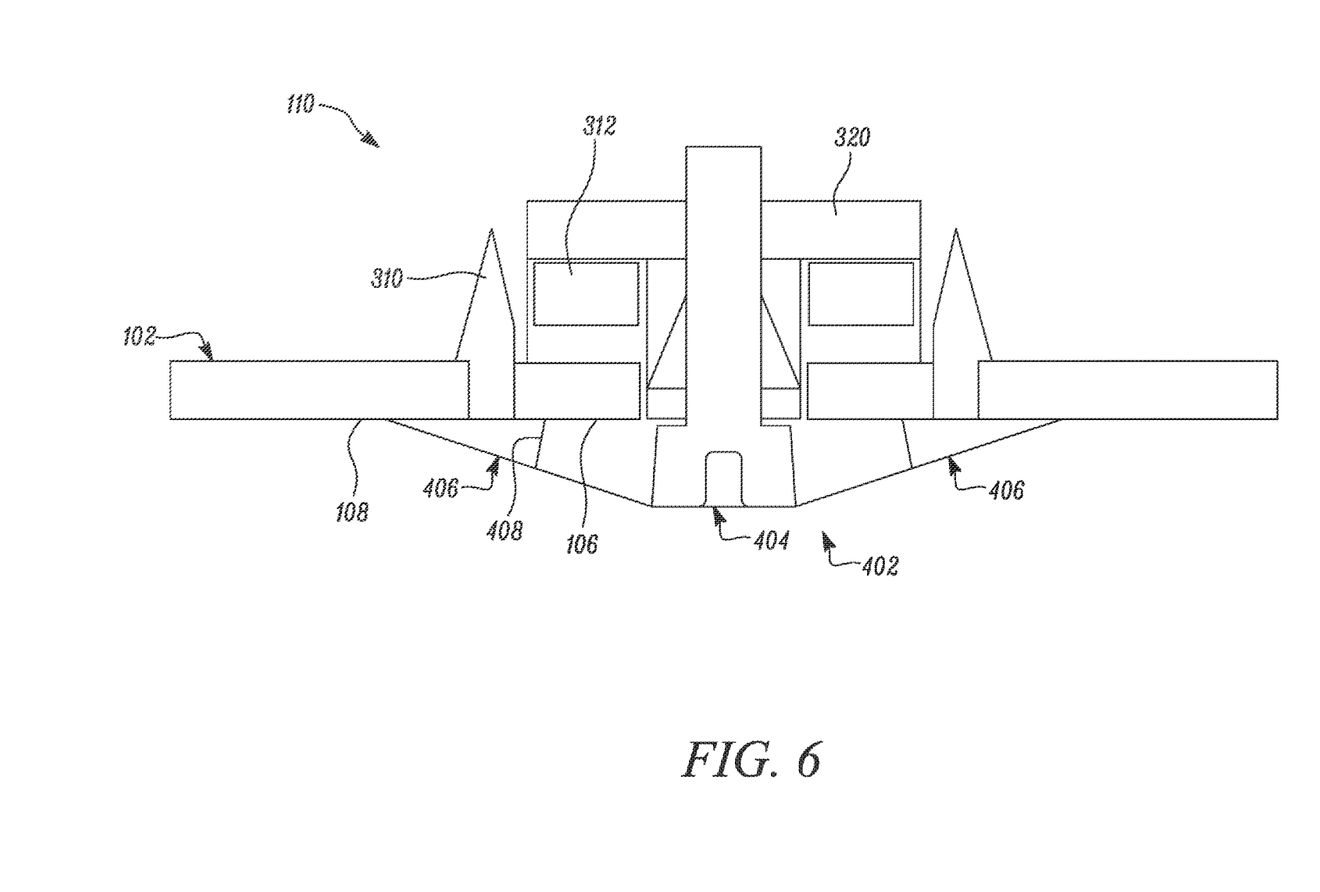
FIG. 6 schematically shows valve being used with housing in a nominal state, according to certain embodiments of the disclosure.

FIG. 5 shows a bottom view of valve element 202. Valve 110 includes umbrella member 402 having first umbrella member portion 404 and second umbrella member portion 406. Circumferential boundary portion 408 of first umbrella member portion 404 separates umbrella member 402 into first umbrella member portion 404 and second umbrella member portion 406. An area of first umbrella member portion 404 is depicted by $A_1$, and an area of second umbrella member portion 406 is depicted by $A_2$. Second area $A_2$ is greater than first area $A_1$ to ensure valve 110 stays closed under application of any external pressure. External pressure may be caused by any external flood around battery system 100. The FIG. 6 schematically illustrates cross-section of valve 110 coupled to enclosure 102 of battery system 100. Valve 110 is illustrated as closed, and sealing opening 106 defined by surface 108 of enclosure 102. For the sake of clarity, enclosure 102 is only partially shown in FIG. 6. Holder 320 with expandable material 312 is shown in contracted state inside enclosure 102. Retainer 310 is coupled to holder 320 such that retainer 310 is in contact with both enclosure 102 and holder 320. When fluid gets inside enclosure 102 (for example, because of internal battery rupture or a leak event), fluid may get filled inside enclosure 102. In such a scenario, expandable material 312 absorbs fluid and expands. In certain embodiments, the retainer 310 has a portion that extends wider circumferentially than the membrane and contains a spray shield. The spray shield is a member that extends around the circumference of the membrane and prevents any liquid from unintendedly entering the battery enclosure (or other enclosure) by shielding liquid, for example, when a user power washes the battery enclosure.

Figure 7:
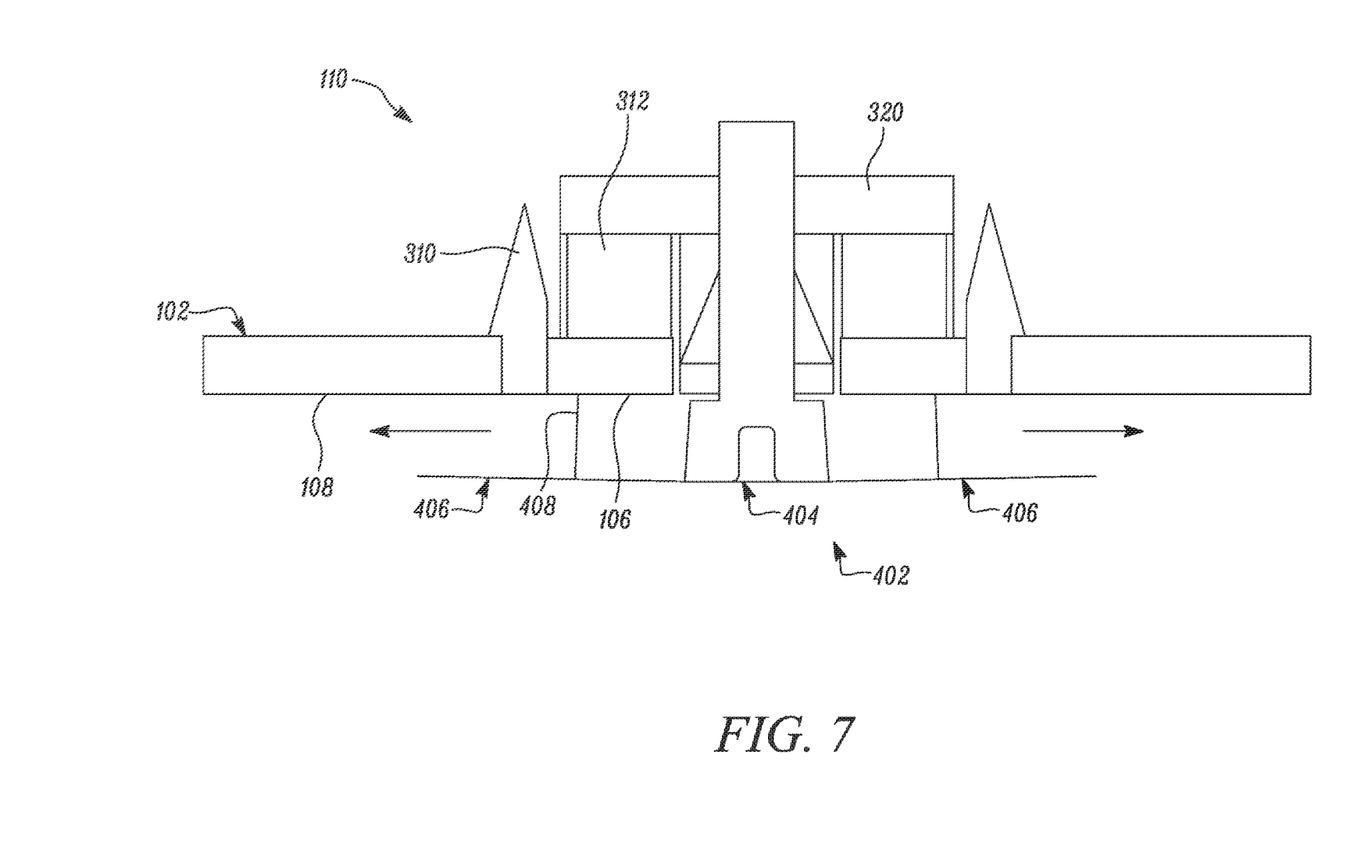
FIG. 7 schematically shows valve being used with housing in an open state, according to certain embodiments of the disclosure.

FIG. 7 shows holder 320 with expandable material 312 in expanded state. When the expandable material 312 expands it causes umbrella member 402 to translate along its axis from the pivoting of the umbrella member 402 (and release fluid). As shown in FIG. 7, second umbrella member portion 406 is tilted relative to first umbrella member portion 404, and allows fluid to pass through opening 106.

Figure 8:
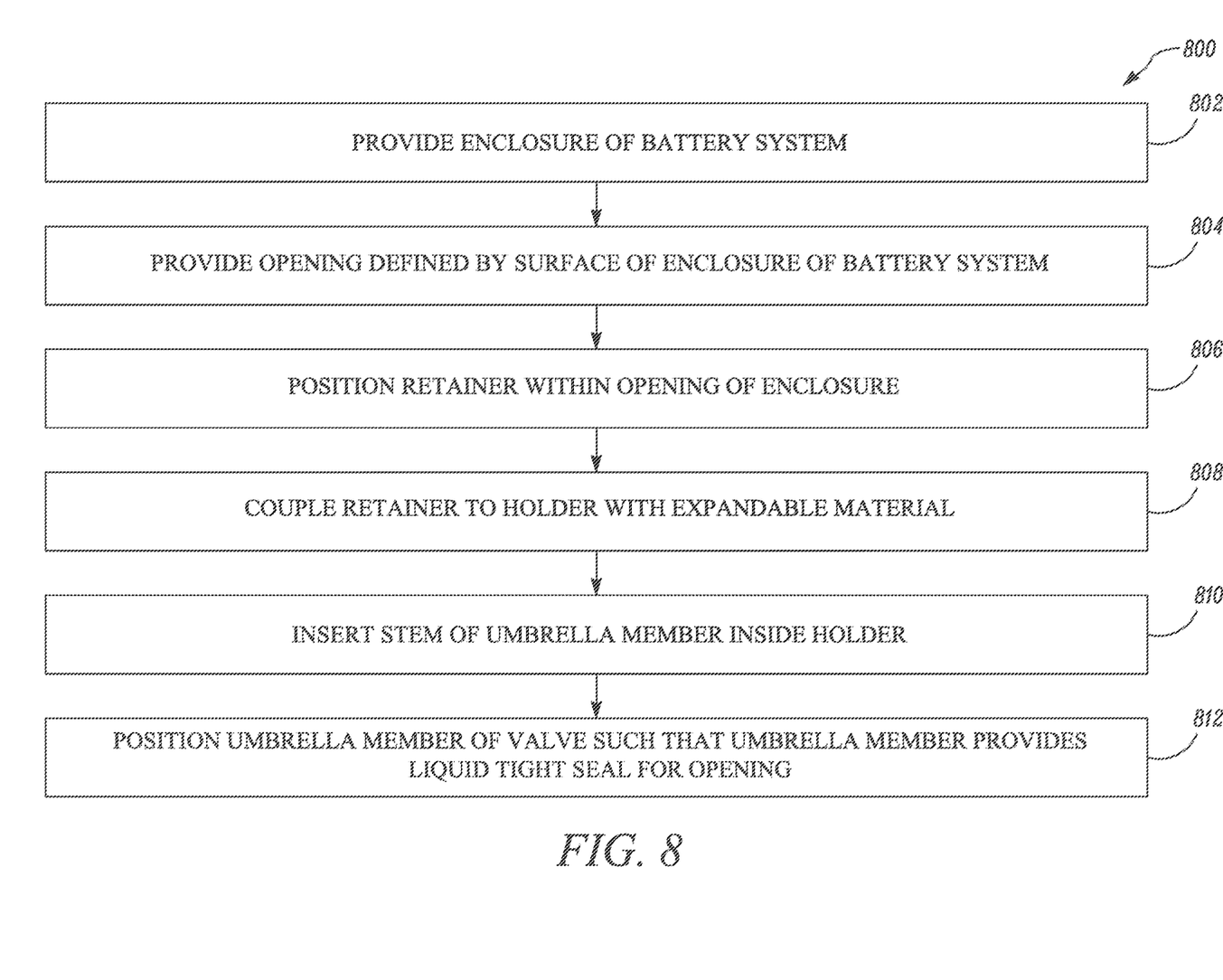
FIG. 8 shows a flow chart illustrating a method of assembling valve with housing of battery enclosure, according to certain embodiments of the disclosure.

FIG. 8 illustrates a method 800 of assembling valve 110 within battery system 100. Method 800 at step 802 includes providing enclosure 102 of battery system 100. Multiple cells 104 are housed inside enclosure 102 of battery system 100. Method 800 at step 804 includes providing opening 106 defined by surface 108 of enclosure 102 of battery system 100. Method 800 at step 806 includes positioning retainer 310 within enclosure 102. Method 800 at step 808 includes coupling retainer 310 to holder 320, which is holding expandable material 312. In certain embodiments, step 806 is not included and the functionality of retainer 310 is contained elsewhere, for example in enclosure 102. Retainer 310 contacts both enclosure 102 and circumferential boundary portion 408 of umbrella member 402. Method 800 at step 810 includes inserting first end 304 of stem 302 of valve element 202 inside enclosure 102 through opening 106. Step 812 includes positioning umbrella member 402 of valve 110 such that umbrella member 402 provides a liquid tight seal for opening 106.

Method 800 may further include adjusting conical washer extending from stem 302 relative to enclosure 102 to keep valve element 202 in place relative to enclosure 102. Method 800 may further include steps to disengage valve 110 from enclosure 102 of battery system 100. Method 800 may include twisting stem 302 to disengage conical washer from enclosure 102. Disengaging conical washer allows valve element 202 to move relative to enclosure 102. Method 800 may further include disengaging valve element 202 from enclosure 102, and pulling out first end 304 of stem 302 outside of enclosure 102 through opening 106 defined by surface 108 of enclosure 102.

Figure 9:
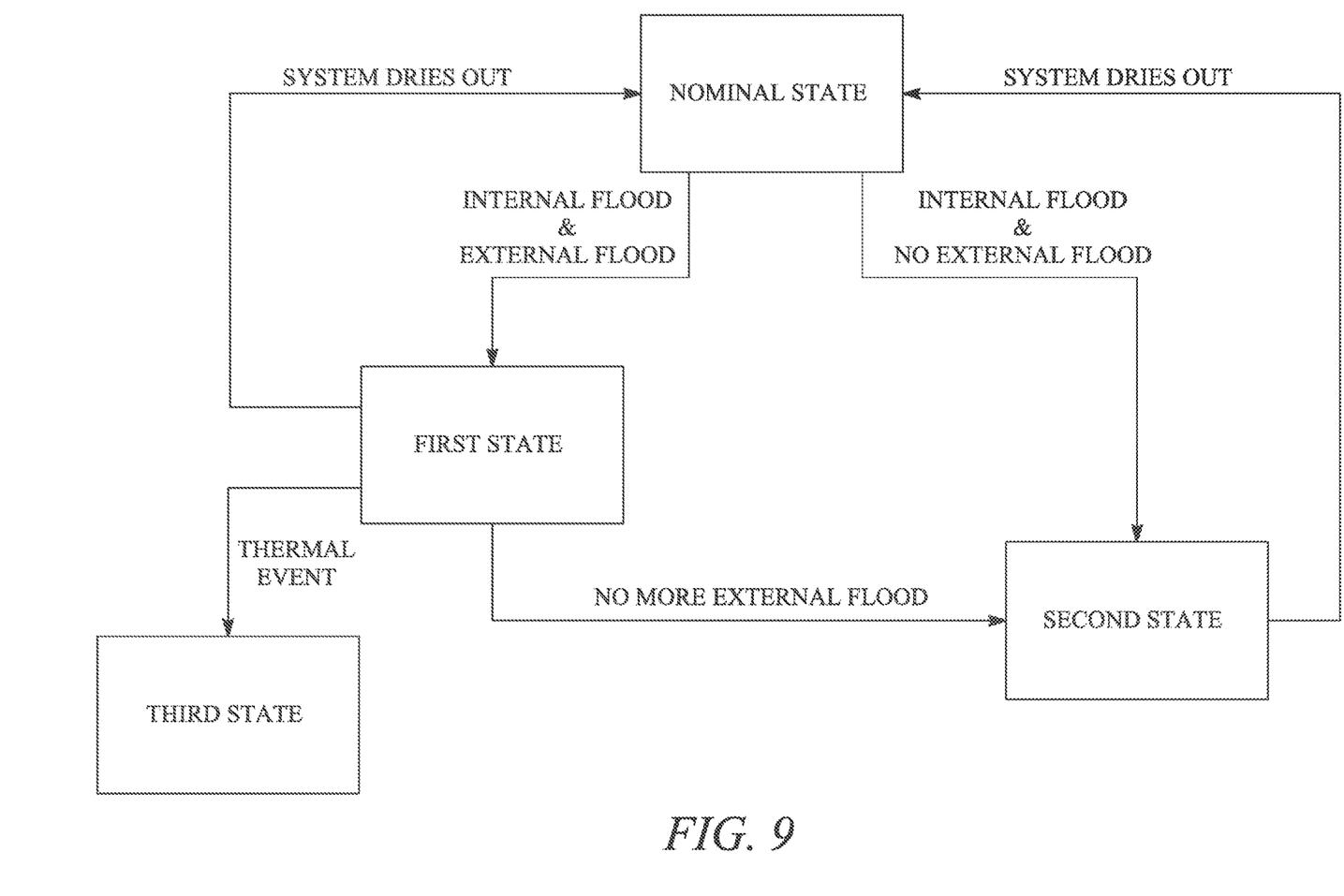
FIG. 9 shows a state diagram of valve illustrating various scenarios, according to certain embodiments of the disclosure.

FIG. 9 shows various scenarios which may occur with respect to state of valve 110. At block 902, valve 110 is in nominal state. Nominal state refers to valve 110 is in closed state, and expandable material 312 is in dry state. An exemplary scenario includes both internal flooding and external flooding of battery system 100. In such a scenario, valve 110 switches to a first state. First state refers to valve 110 in closed state, and expandable material 312 being wet due to internal flooding. Valve 110 does not allow any external fluid to pass inside enclosure 102 due to external flooding. The pivot and the ratio of the diameters impacts is preferentially chosen to prevent impingement of water (or another liquid) during an external flooding event. For example, a ratio of threshold tilting diameter $D_T$ and first diameter $D_1$ may be between 1.4-3.0. In certain embodiments, the ratio may be greater than 3.0. During operation, when the membrane pivots, the valve may be translated along the axis of the stem. In embodiments, a washer portion is located around the stem, which constrains the expanding material. This constrains the valve in a closed manner until the expanding material absorbs sufficient liquid to overcome the constraint and translate the valve along the axis from the pivoting of the membrane (and release fluid).

If there is no more external flooding but internal flooding still persists, then valve 110 switches to a second state. Second state refers to valve 110 in open state, and expandable material 312 being wet due to internal flooding. Initially, if there is only internal flooding and no external flooding, then valve 110 switches directly to second state. As valve 110 is open in second state, fluid may be passed outside of battery system 100 through open valve 110. When there is no more flooding, either in first state or second state, battery system 100 may eventually dry out, and valve 110 may return to nominal state.

If a thermal runaway event occurs, for example, cells rupture within a battery enclosure creating a large internal pressure, then valve element 202 switches to a third state. Third state refers to valve 110 in open state from the internal pressure of the generated. In third state, expandable material 312 has not absorbed much, if any, liquid. As valve 110 is open in third state, gas may be passed outside of battery system 100 through open valve 110. When the internal pressure of the gas within the battery enclosure has decreased, and is approximately the same as the pressure outside of the module, valve 110 may close and return to nominal state.

Figure 10:
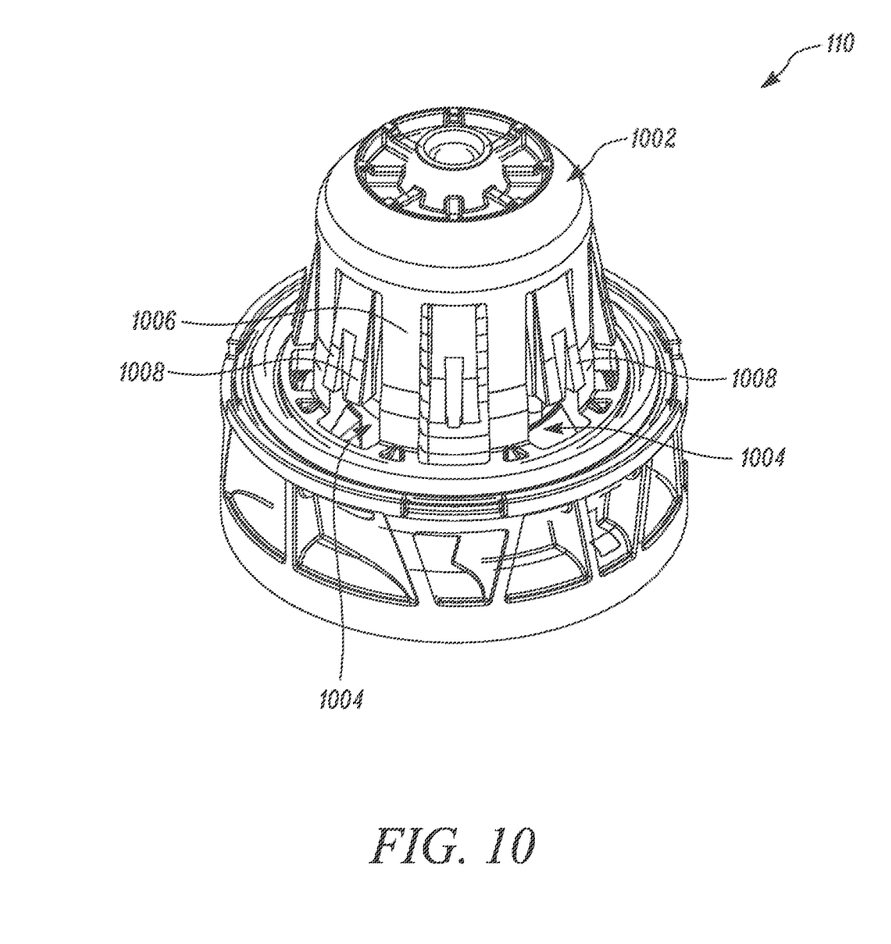
FIG. 10 shows a perspective view of valve, according to certain embodiments of the disclosure.
Figure 11:
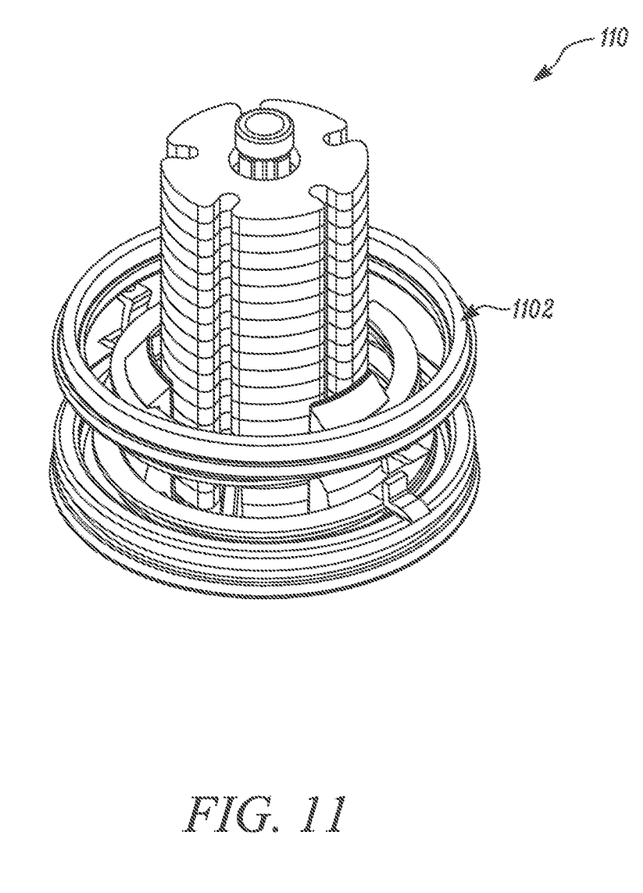
FIG. 11 shows a perspective view of valve of FIG. 10 without a cap, according to certain embodiments of the disclosure.
Figure 12:
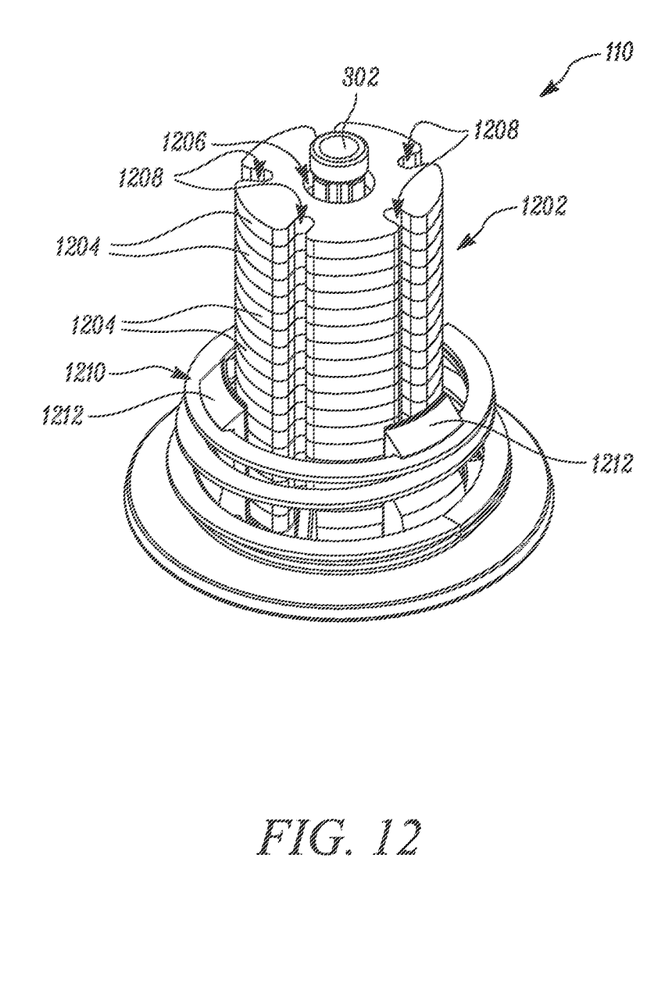
FIG. 12 shows a perspective view of valve of FIG. 10 without a cap and a seal, according to certain embodiments of the disclosure.

FIGS. 10-12 show another structural configuration of valve 110. Valve 110 includes a cap 1002 which covers internal components of valve 110. Cap 1002 may be retained with enclosure 102 through any suitable mechanical retaining means. In illustrated embodiment, cap 1002 includes multiple grooves 1004 on an external surface 1006 of cap 1002. Enclosure 102 includes multiple elastically deformable tabs 1008 such that tabs 1008 engage with grooves 1006 and couple cap 1002 and enclosure 102 together.

FIG. 11 shows valve 110 without cap 1002 to show internal structure of valve 110. Valve 110 include a seal 1102 coupled between cap 1002 and enclosure 102 to make sure any fluid does not enter from under cap 1002. Seal 1102 may be a gasket, or any other suitable sealing means which may be suitable for application with aspects of present disclosure.

FIG. 12 shows valve 110 without cap 1002 and seal 1102. Valve 110 includes expandable material 1202. Expandable material 1202 is illustrated as a stack of multiple non-circular shaped elements 1204. Non-circular shaped elements 1204 are provided with a central hole 1206 such that expandable material 1202 may be placed around stem 302 of valve 110. In certain embodiments, expandable material 1202 is paper. Present disclosure is not limited by illustrated shape of non-circular shaped elements 1204. Non-circular shaped elements 1204 may have any non-circular shape as per application requirements. Non-circular shaped elements are provided with slots 1208 on a periphery of each non-circular shaped element to increase surface area of expandable material 1202. Increased surface area provides better absorption characteristics for expandable material, making valve function more effectively. In certain embodiments, expandable material 1202 has an integral non-circular shaped structure.

Valve 110 further includes a spring 1210 coupled to enclosure 102. Spring 1210 has a helical structure such that spring 1210 is partially wrapped around expandable material 1202. Multiple spacer elements 1212 are provided between spring 1210 and expandable material 1202 to make sure expandable material 1202 remains in a compressed state. For assembly of valve 110, expandable material 1202 in form of stack of multiple non-circular shaped elements 1204 is placed around stem 302 of valve 110. Spring 1210 is wrapped around expandable material 1202 with help of spacer elements 1212. Afterwards, cap 1002 and seal 1102 are provided to cover internal components of valve 110.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed air vent assembly. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application. Additionally, any signal hatches in the drawings/figures should be considered only as exemplary, and not limiting, unless otherwise specifically specified.

What is claimed is:

1. A battery enclosure comprising:
an enclosure comprising an opening; and
a multi-state valve coupled to the opening of the enclosure, the multi-state valve comprising an expandable material that varies in size based at least in part on a presence of fluid, wherein expansion of the expandable material to a threshold size causes the multi-state valve to transition from a closed state to an open state, wherein in the closed state the multi-state valve prevents fluid flow through the opening, wherein in the open state the multi-state valve permits fluid flow through the opening;
wherein the expandable material is configured to expand in size in response to absorbing the fluid,
wherein expansion of the expandable material to a threshold size causing the multi-state valve to transition from a closed state to an open state comprises the multi-state valve transitioning from the closed state to the open state in response to an internal pressure of the enclosure satisfying a threshold pressure,
wherein the enclosure comprises at least one battery cell, and wherein the internal pressure of the enclosure satisfies the threshold pressure in response to a rupture of the at least one battery cell.

2. The battery enclosure of claim 1, wherein the expandable material contracts in size in response to losing absorbed fluid.

3. The battery enclosure of claim 1, wherein an internal flooding within the enclosure causes the expandable material to absorb the fluid and expands in size to at least the threshold size.

4. The battery enclosure of claim 1, wherein the threshold size is a first threshold size, wherein contraction by the expandable material to a second threshold size causes the multi-state valve to transition from the open state to the closed state.

5. The battery enclosure of claim 4, wherein drying out causes the expandable material to lose absorbed fluid and contract in size to at least the second threshold size.

6. The battery enclosure of claim 1, wherein the enclosure is a battery enclosure, wherein the enclosure further comprises a plurality of cells housed inside the enclosure.

7. A valve comprising:
a valve configured to couple to an opening of an enclosure and selectively allow drainage of fluid from inside of the enclosure through the opening, the valve comprising an expandable material that expands in response to absorption of the fluid, wherein threshold expansion by the expandable material causes the valve to transition to an open state to allow at least some of the fluid to exit the enclosure, wherein threshold expansion by the expandable material causing the valve to transition to an open state comprises the valve transitioning to the open state in response to an internal pressure of the enclosure satisfying a threshold pressure, wherein the enclosure comprises at least one battery cell, and wherein the internal pressure of the enclosure satisfies the threshold pressure in response to a rupture of the at least one battery cell.

8. The valve of claim 7, wherein the threshold expansion by the expandable material occurs responsive to internal flooding within the enclosure.

9. The valve of claim 7, wherein the expandable material is configured to at least partially dry out and contract after it expands in response to contact with the fluid.

10. The valve of claim 9, wherein in the open state, threshold contraction by the expandable material causes the valve to transition to a closed state.

11. The valve of claim 7, wherein the valve operates in a normally closed state.

12. The valve of claim 7, wherein the valve remains in a closed state in response to external flooding of the enclosure.

13. The valve of claim 7, wherein the enclosure comprises at least one battery cell.

14. The valve of claim 7, wherein the enclosure comprises at least one battery cell.

15. An enclosure defining an opening, the enclosure comprising:

a multi-state valve configured to couple to the enclosure, the multi-state valve comprising a means for selectively allowing fluid to flow through the opening, the multi-state valve having a plurality of operational states comprising at least a closed state in which the multi-state valve prevents fluid flow through the opening and an open state in which the multi-state valve permits fluid flow through the opening, the multi-state valve comprising a means for transitioning between at least two of the operational states;

wherein the means for transitioning between the at least two of the operational states comprises an expandable material means;

wherein the expandable material means is responsive to fluid absorption;

wherein threshold expansion of the expandable means causes the valve to transition to the open state, wherein the threshold expansion of the expandable material causing the valve to transition to an open state comprises the valve transitioning to the open state in response to an internal pressure of the enclosure satisfying a threshold pressure, wherein the enclosure comprises at least one battery cell, and wherein the internal pressure of the enclosure satisfies the threshold pressure in response to a rupture of the at least one battery cell.

* * * * *